(12) United States Patent
Allan et al.

(10) Patent No.: US 6,421,168 B1
(45) Date of Patent: Jul. 16, 2002

(54) REDUCTION OF ASE IN WDM OPTICAL RING NETWORKS

(75) Inventors: Graham R. Allan, Columbia; Gary Duerksen, College Park, both of MD (US)

(73) Assignee: Seneca Networks, Rockville, MD (US)

( * ) Notice: Subject to any disclaimer, the term of this patent is extended or adjusted under 35 U.S.C. 154(b) by 0 days.

(21) Appl. No.: 10/033,888

(22) Filed: Jan. 3, 2002

Related U.S. Application Data

(63) Continuation-in-part of application No. 09/917,750, filed on Jul. 31, 2001.

(51) Int. Cl.$^7$ ................................................. H01S 3/00
(52) U.S. Cl. ....................................................... 359/337
(58) Field of Search ............................ 359/337.1, 337, 359/341.1, 341.4, 119, 337.2, 337.21

(56) References Cited

U.S. PATENT DOCUMENTS

| | | | |
|---|---|---|---|
| 5,117,196 A | 5/1992 | Epworth et al. | 359/333 |
| 5,117,303 A | 5/1992 | Desurvire et al. | 359/341 |
| 5,283,686 A | 2/1994 | Huber | 359/337 |
| 5,394,265 A | 2/1995 | Nagel et al. | 359/341 |
| 5,598,294 A * | 1/1997 | Uno et al. | 359/176 |
| 5,600,481 A | 2/1997 | Nakabayashi | 359/341 |
| 5,696,615 A | 12/1997 | Alexander | 359/134 |
| 5,900,968 A | 5/1999 | Srivastava | 359/341 |
| 5,907,420 A | 5/1999 | Chraplyvy | 359/179 |
| 6,025,941 A * | 2/2000 | Srivastava et al. | 359/110 |
| 6,067,187 A | 5/2000 | Onaka et al. | 359/341 |
| 6,094,516 A * | 7/2000 | Nolting et al. | 385/39 |
| 6,108,123 A | 8/2000 | Kinoshita | 359/337 |
| 6,175,436 B1 | 1/2001 | Jackel | 359/179 |
| 6,233,092 B1 | 5/2001 | Flood et al. | 359/345 |
| 6,259,556 B1 | 7/2001 | Lutz | 359/341 |
| 2001/0053005 A1 * | 12/2001 | Bock et al. | 359/124 |

FOREIGN PATENT DOCUMENTS

| | | | | |
|---|---|---|---|---|
| JP | 2001077451 A | * | 3/2001 | G02F/1/39 |

* cited by examiner

Primary Examiner—Thomas H. Tarcza
Assistant Examiner—Deandra M. Hughes
(74) Attorney, Agent, or Firm—Margaret A. Burke

(57) ABSTRACT

The present invention provides a wavelength division multiplexed optical communication system including an optical fiber ring configured to carry at least one wavelength division multiplexed optical communication signal having plural optical channels at different wavelengths. Optical amplifiers are interposed along the optical fiber ring for optically amplifying the wavelength division multiplexed optical communication signal. Each optical amplifier produces amplified spontaneous emission as well as amplifying the optical channels of the WDM signal. At each amplifier, amplified spontaneous emission is selected by an optical feedback selector and is fed back to the optical amplifier input via an optical feedback path; the created wavelength travels along the ring and is dropped near the input of the next adjacent amplifier, reducing ASE in the optical fiber ring. Using this technique, closed-ring amplified WDM metropolitan networks can be formed without the need to "break the ring" in order to avoid uncontrolled build-up of ASE.

16 Claims, 10 Drawing Sheets

OPTICAL PATH

---------------
ELECTRICAL PATH

REDUCTION OF ASE IN WDM OPTICAL RING NETWORKS

CROSS-REFERENCE TO RELATED APPLICATIONS

This application is a continuation-in-part of U.S. patent application Ser. No. 09/917,750 filed Jul. 31, 2001, the disclosure of which is incorporated by reference herein.

BACKGROUND OF THE INVENTION

1. Field of the Invention

The present invention relates to wavelength division multiplexed optical networks configured in a ring topology and, more particularly, to amplified WDM optical ring networks having reduced amplified spontaneous emission (ASE) through selective feedback of ASE to each optical amplifier in the ring.

2. Description of the Related Art

As the need for communication signal bandwidth increases, wavelength division multiplexing (WDM) has progressively gained popularity for multiplying the transmission capacity of a single optical fiber. A review of optical networks, including WDM networks, can be found in Ramaswamni et al. *Optical Networks: A Practical Perspective* (Morgan Kaufman, © 1998), the disclosure of which is incorporated herein by reference. In wavelength division multiplexed optical networks, plural optical channels having different wavelengths are combined together in a single optical fiber. Typically, WDM optical networks are amplified using optical amplifiers; optical amplifiers permit the direct amplification of optical signals without the need to convert to electrical signals. In many optical amplifiers, such as erbium-doped fiber amplifiers (EDFAs), undesirable spontaneous emission is produced; in this process, dopant atoms excited by pump lasers "spontaneously" relax from an excited level to a lower energy state. As a result of this relaxation, a photon is emitted which is then amplified by the optical amplifier, reducing the overall amplifier gain (i.e., amplifier photons which would have been available for stimulated emission involving optical channels are instead used to amplify the spontaneously-emitted photons) and producing unwanted noise.

In many optical networks, optical fibers are arranged in a series of optical rings in order to protect optical paths in the event of a fiber cut. When an optical path is disrupted, optical traffic originally configured to traverse that path is re-routed in another direction around the ring ("path diversity") in order to arrive at the intended destination. Because these optical rings may be hundreds of kilometers in circumference, plural optical amplifiers are positioned along the ring. Consequently, the problem of amplified spontaneous emission is compounded when plural amplifiers are concatenated along the optical path, each amplifier receiving the ASE of the preceding amplifiers in the amplifier chain. When the optical path is configured as a ring, this parasitic process can ultimately consume nearly all the amplifier gain as ASE from the initial amplifier is re-fed to that amplifier (and re-amplified) as it traverses the ring.

Several attempts have been made to reduce the impact of amplified spontaneous emission in optical networks. One approach is to drive the optical amplifiers in a manner such that the production of ASE is minimized. This approach is depicted in U.S. Pat. No. 5,117,303; in this patent, concatenated amplifiers are operated in the saturated state. Although this technique may be useful for systems having a single optical channel to be amplified, it is does not result in ASE reduction sufficient for WDM optical systems with large numbers of optical channels and numerous concatenated amplifiers.

Other approaches to ASE reduction in optical networks rely on optical filtering to remove the portion of the optical spectrum containing the undesired emission. For example, in U.S. Pat. No. 5,283,686 an optical amplifier is coupled with a narrow bandwidth optical filter for removing undesired spontaneous emission. In-fiber Bragg gratings coupled to an optical circulator are used to reflect optical channels to a transmission waveguide while spontaneous emission exits the optical network by passing through the Bragg gratings. In U.S. Pat. No. 5,696,615 an optical filter is optionally employed to remove the portion of the optical spectrum below 1540 nm for erbium doped fiber amplifiers at each amplifier location in order to remove ASE. Similarly, U.S. Pat. No. 5,394,265 removes ASE along with an optical service channel in between the stages of a two-stage erbium amplifier. While optical filtering is an effective way to remove ASE from an optical system, filtering only removes ASE in the wavelength region being filtered. Some forms of filtering also remove a large portion of the gain spectrum of an optical amplifier, thereby reducing the availability of optical channel wavelengths, which may be accommodated by that amplifier.

In U.S. Pat. No. 6,175,436 ASE feedback is used in a gain control technique for a series of amplifiers in a point-to-point optical network. A lasing signal is created for gain equalization. In a chain of amplifiers, only the first amplifier is equalized; the lasing signal traverses the entire length of the optical network through each of the concatenated amplifiers such that the lasing signal is amplified by each subsequent amplifier. Although this technique may be used for gain equalization in a point-to-point optical network, it cannot be used to address the problem of "runaway" ASE in amplified optical rings; the serial amplification of ASE through the application of the '436 patent to an optical ring would drastically deplete available amplifier gain (as discussed below).

There is a need in the art for optical networks in which the impact of amplified spontaneous emission on network functioning is minimized while substantially preserving the optical gain spectrum of the selected optical amplifiers. Such a technique could be implemented in closed-loop amplified optical ring networks to prevent serial amplification of ASE.

SUMMARY OF THE INVENTION:

The present invention improves the performance of optical networks, particularly optical ring networks, by reducing amplified spontaneous emission thereby increasing the available gain of optical amplifiers within that network. In one embodiment the invention provides a WDM optical communication system including an optical fiber ring configured to carry at least one wavelength division multiplexed optical communication signal having plural optical channels at different wavelengths. Optical amplifiers are interposed along the optical fiber ring for optically amplifying the wavelength division multiplexed optical communication signal. Each optical amplifier produces amplified spontaneous emission as well as amplifying the optical channels of the WDM signal. At each optical amplifier, amplified spontaneous emission is selected by an optical feedback selector positioned in optical communication with an amplifier output. The selected amplified spontaneous emission is fed back to each optical amplifier input via an optical feedback path.

A lasing wavelength spontaneously generated by oscillation within the feedback traverses the optical ring to the next adjacent amplifier where it is dropped. A new wavelength is created at that amplifier and launched onto the optical ring where it is dropped at the next adjacent amplifier. Thus, each amplifier on the ring drops the wavelength created by each upstream amplifier, reducing amplified spontaneous emission in the optical fiber ring. Using this technique, closed-ring amplified WDM metropolitan networks can be formed without the need to "break the ring" in order to avoid uncontrolled build-up of ASE.

BRIEF DESCRIPTION OF THE DRAWINGS

FIG. 3B shows details of the optical nodes of FIG. 3A and FIG. 3C shows details of an ASE-reduction module of FIG. 3A.

DETAILED DESCRIPTION

Figure 1:
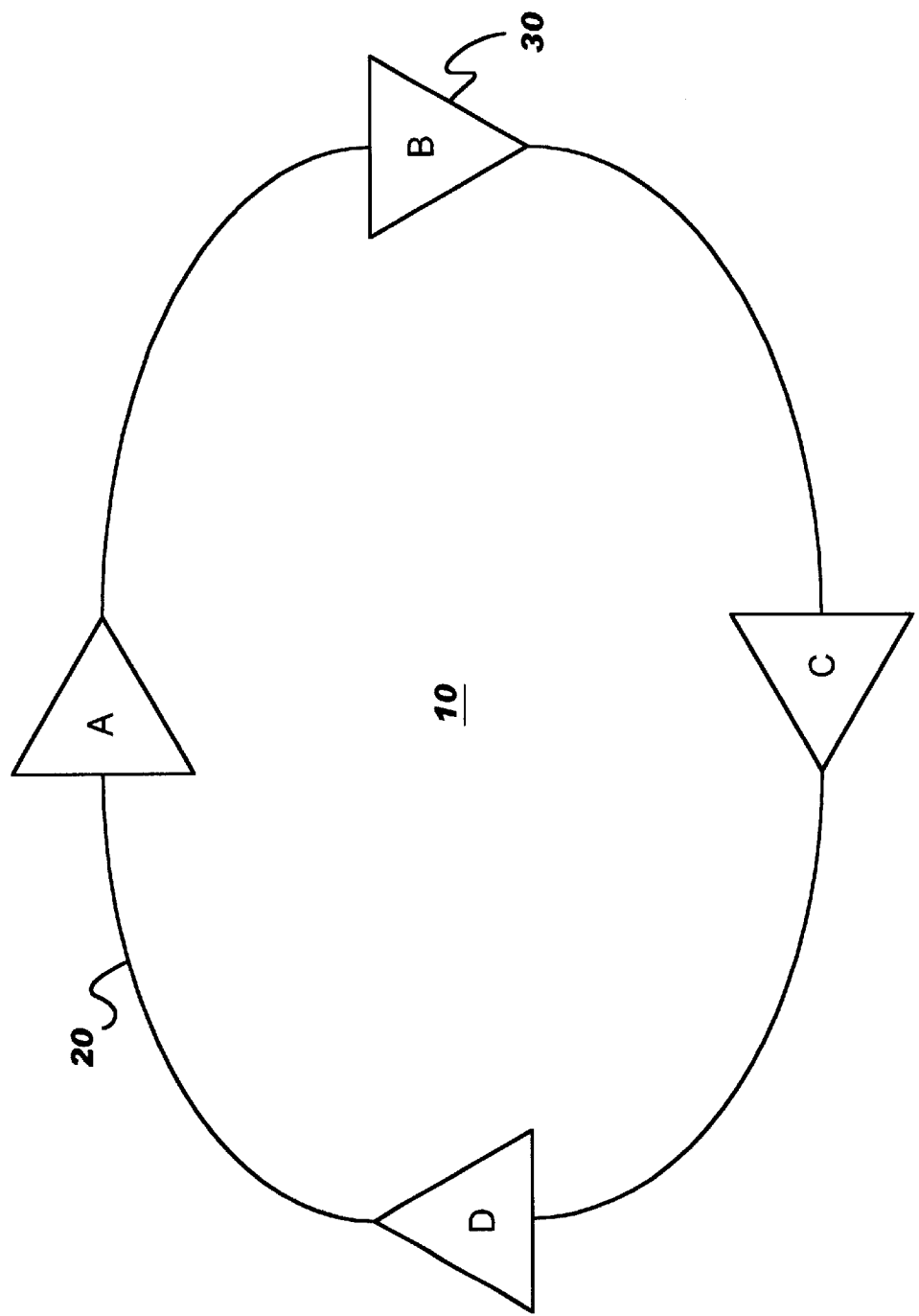
FIG. 1 schematically depicts an optical ring network having optical amplifiers A, B, C, and D.

Turning now to the drawings in detail, FIG. 1 schematically depicts amplifier locations in a wavelength division multiplexed optical communication network 10. Optical network 10 is configured as an optical ring and includes optical amplifiers 30 positioned along an optical waveguide 20. As used herein, the expression "wavelength division multiplexed" or "WDM" refers to any optical system or signal composed of plural optical channels having different wavelengths, regardless of the number of channels in the system or signal. As such, the term "wavelength division multiplexing" or "WDM" encompasses all categories of WDM such as DWDM (dense wavelength division multiplexing) and CWDM (coarse wavelength division multiplexing). A review of optical networks, including WDM networks, can be found in Ramaswami et al., *Optical Networks: A Practical Perspective* (Morgan Kaufman, © 1998), incorporated by reference above. Although not shown in FIG. 1 for clarity of presentation, it is understood that an actual optical ring network would typically include optical nodes for adding and dropping optical channels carried on the ring.

Optical channels in a WDM system are attenuated as they traverse optical waveguide 20; consequently, optical amplifiers 30 are positioned at various locations within the network. The spacing of the amplifiers depends upon the overall network configuration including such factors as the number of optical channels within the WDM signal, the type of optical waveguide, and the strength of the optical channels. Optical amplifiers 30 are selected from devices that directly amplify an optical signal without the need to convert it to an electrical signal. Typically, optical amplifiers 30 are rare earth doped optical fibers, which are pumped with one or more lasers to excite the rare earth dopants. As an optical channel to be amplified traverses the doped optical fiber, the optical channel stimulates the emission of a photon as the excited dopant atom returns to a lower energy state. The photon is emitted at the channel wavelength, increasing its strength. Exemplary doped fiber amplifiers include, but are not limited to, erbium doped fiber amplifiers, praseodymium doped fiber amplifiers, neodymium doped fiber amplifiers in host fibers of silica or non-silica (e.g., fluoride) based glasses. Details of optical amplifiers which may be used with the present invention (including both unidirectional and bidirectional amplifiers) are presented in Becker et al., *Erbium-Doped Fiber Amplifiers: Fundamentals and Technology*, (Academic Press, San Diego, 1999), the disclosure of which is incorporated by reference herein. It is noted that the configuration, amplifier material, pumping, etc. of the optical amplifiers is not critical to the present invention which is generally applicable to all optical networks which include optical amplification. Note that for clarity of presentation, none of the optical pumps or their connections to the optical amplifiers is shown. The amplifier symbols may represent single or multiple stage amplifiers with single or multiple pumps at the same or different wavelengths as in known in the art.

Figure 2:
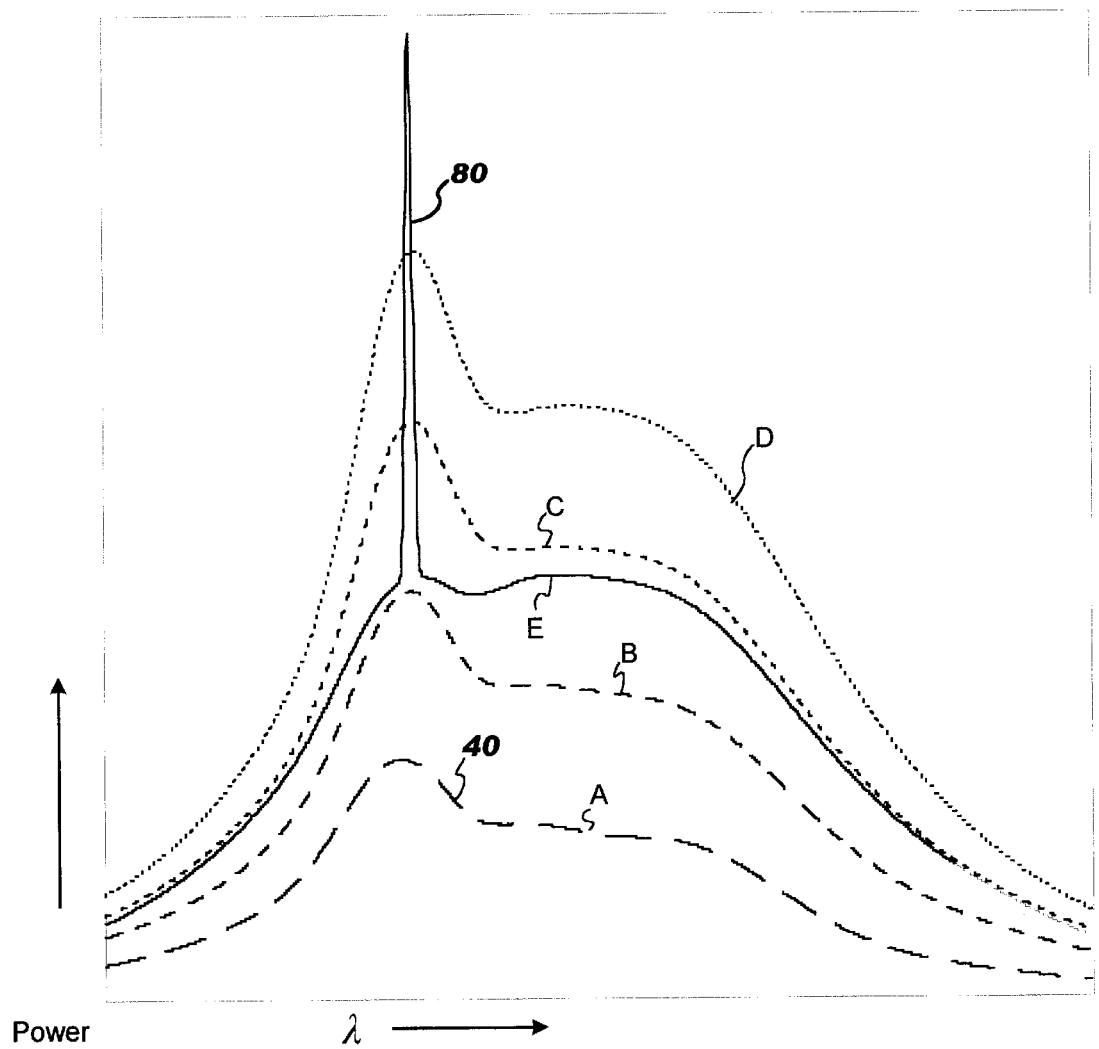
FIG. 2 schematically depicts the ASE profile at the amplifier locations within the FIG. 1 optical ring without the ASE control methods of the present invention.

FIG. 2 schematically depicts the ASE profiles of the optical amplifiers of FIG. 1. For the purpose of FIG. 2, the amplifiers of FIG. 1 are selected to be C-band erbium-doped silica optical fibers pumped by 980 nm and/or 1480 nm pump lasers. Curve A represents the ASE profile following amplifier A, curve B is the ASE profile following amplifier B, curve C follows amplifier C, curve D follows amplifier D and curve E represents the ASE profile after amplifier A after a second traversal of the amplifier. As seen in curve A, the ASE profile includes a peak; this peak is located in the region from about 1529 nm to about 1534 nm. For erbium-doped fiber amplifiers, this wavelength range represents the region of greatest spontaneous emission. Because larger optical signals stimulate larger amounts of emission from the excited species, this region of spontaneous emission is disproportionately amplified by the amplifier, creating the large region of amplified spontaneous emission 40 in curve A (representing the ASE profile at the output of amplifier A in FIG. 1).

The ASE from amplifier A traverses optical waveguide 20 and is input to optical amplifier B. The now-amplified spontaneous emission is further amplified by amplifier B along with spontaneous emission from amplifier B, creating larger ASE. This noise progressively builds in amplifiers C and D as can be seen in curves C and D. Finally, the cumulative noise is re-fed as input to amplifier A, shown in curve E. This combination of feedback plus gain from the pumped erbium fiber creates conditions for lasing. As a result, parasitic lasing in the form of peak 80 in curve E (taken at the output of amplifier A in the ring after the second pass through the amplifier) can occur, drastically depleting amplifier gain, as seen in curve E. If allowed to continue, parasitic lasing peak 80 would continue through the chain of amplifiers creating "runaway" ASE amplifier gain depletion and rendering the amplifier chain incapable of sufficiently increasing the gain of the optical channels comprising the WDM signal.

Figure 3A:
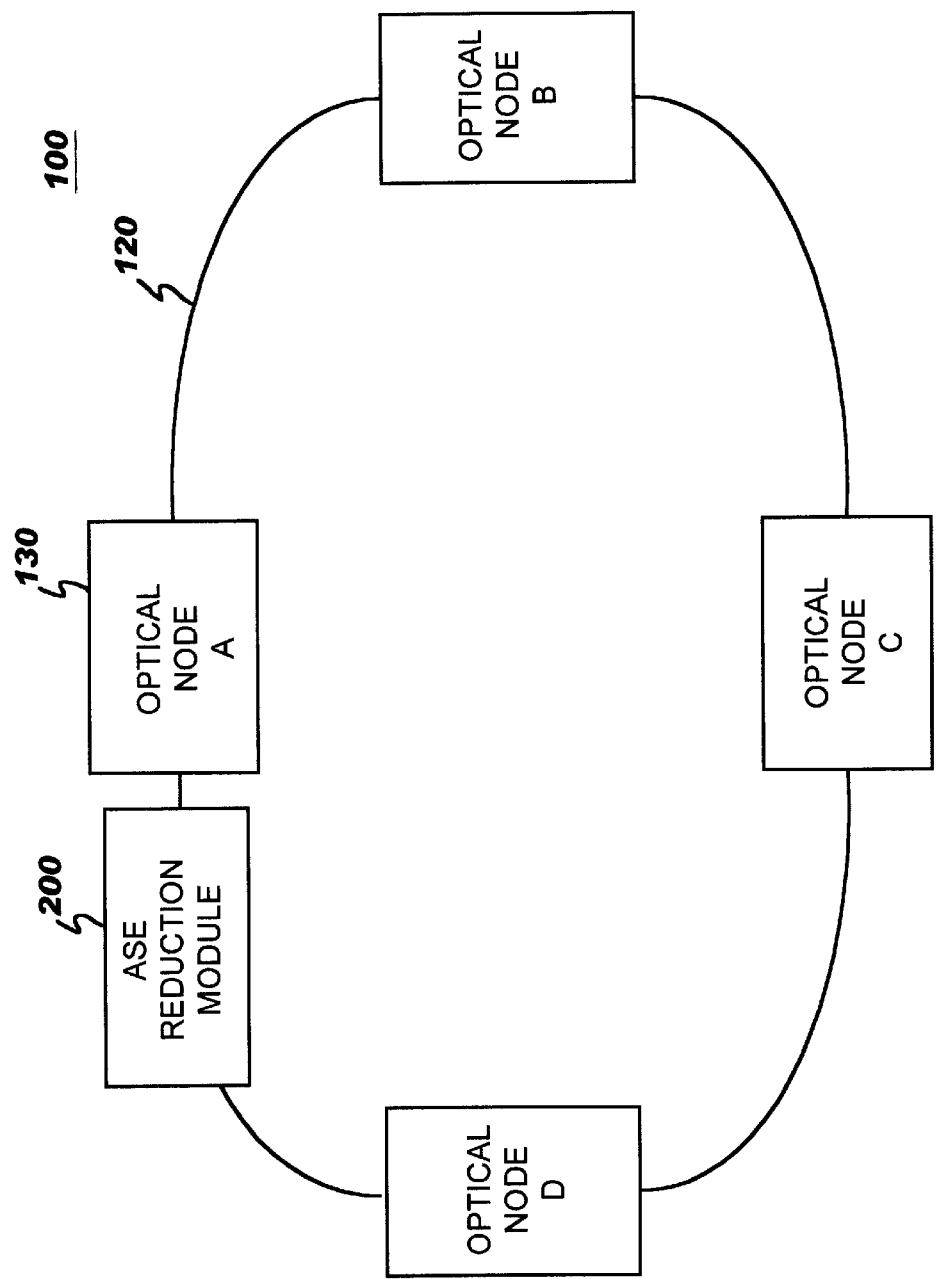
FIGS. 3A–3C schematically depict a first embodiment of an optical ring network including an ASE reduction module for adding and dropping an ASE-reducing optical wavelength to and from the ring.
Figure 3B:
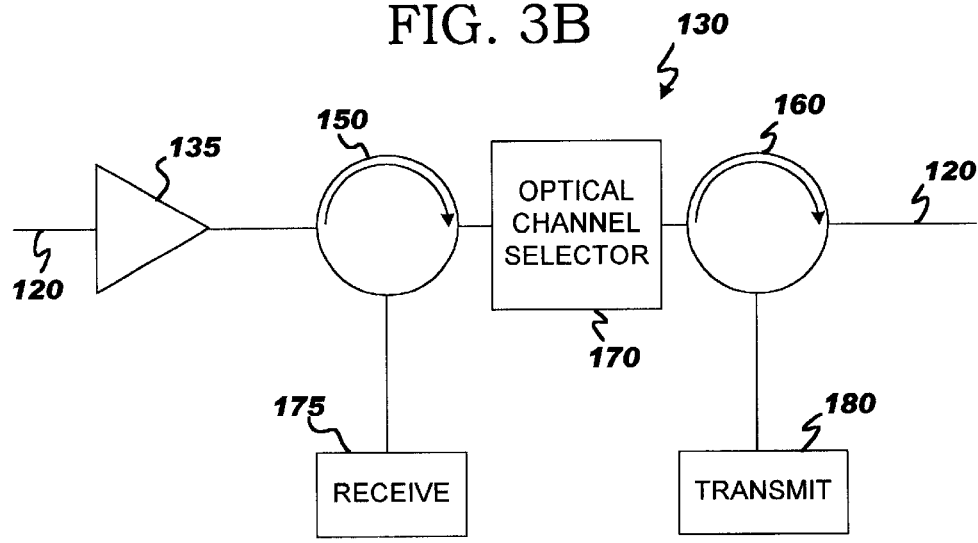
Figure 3C:
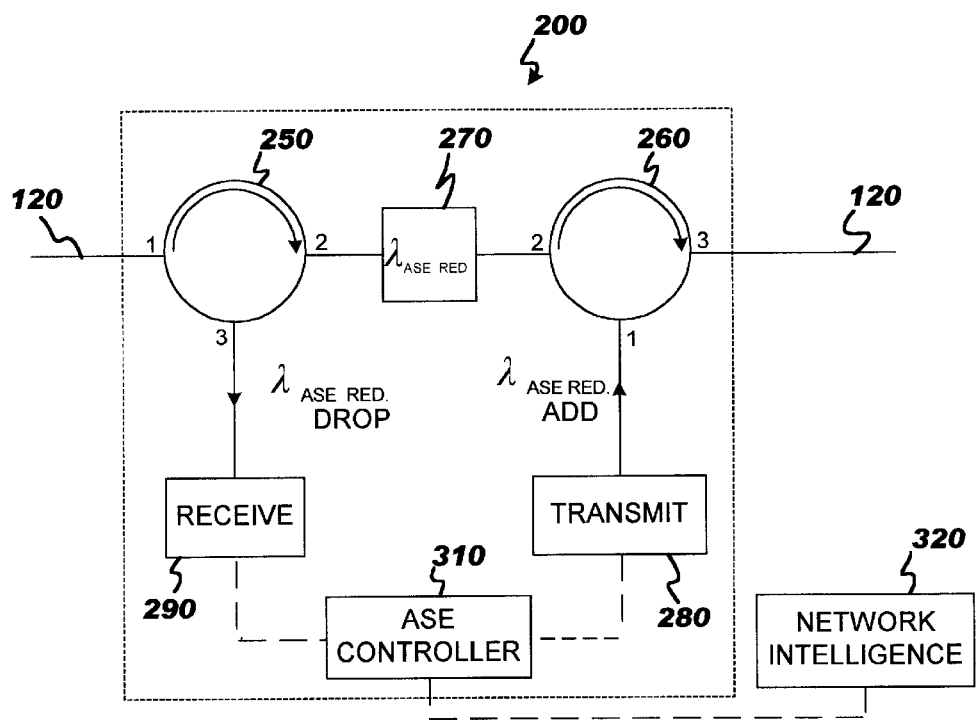
Figure 4:
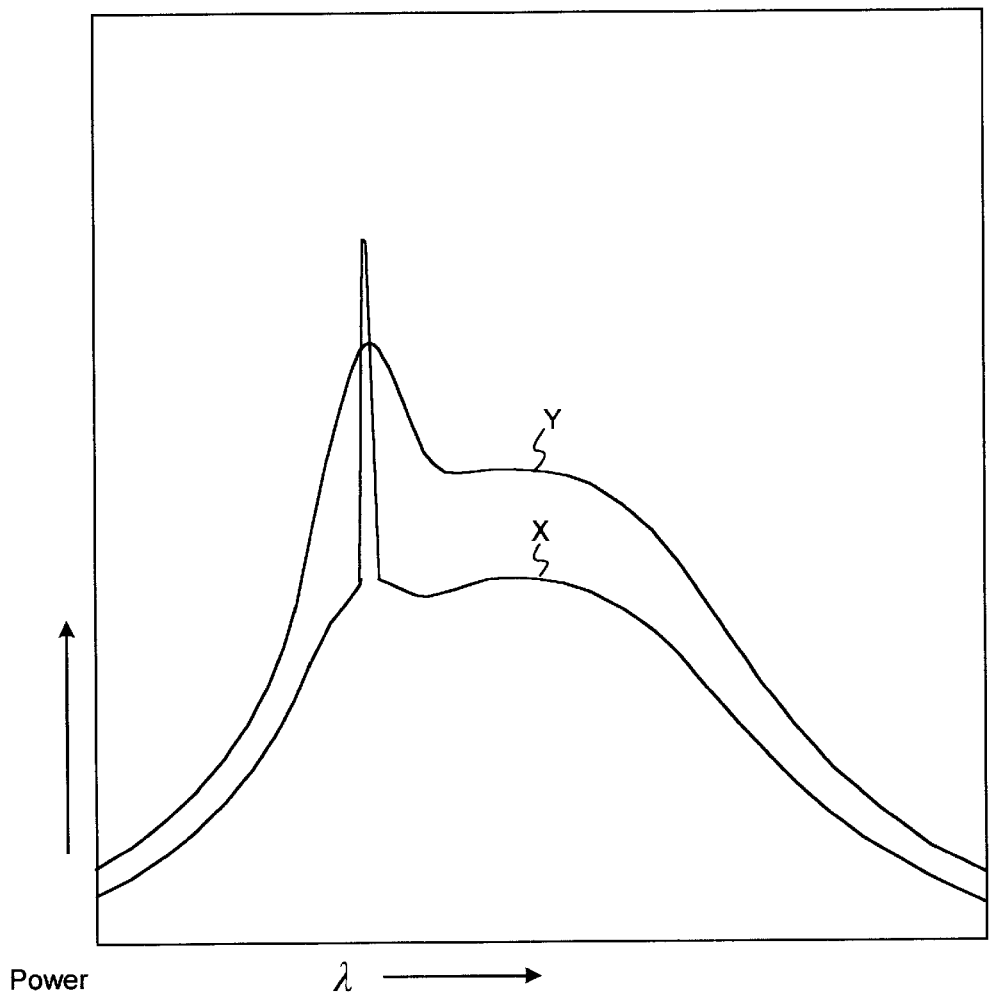
FIG. 4 shows the reduction of ASE of an optical amplifier using the techniques of the present invention.

FIG. 3A depicts an optical network 100 according to one embodiment of the present invention, which includes plural optically amplified optical nodes 130 positioned along optical waveguide 120. An ASE reduction module 200 is positioned prior to optical node A, the node arbitrarily designated as the "first" node in the optical ring. However, it is understood that in contrast to a point-to-point optical network, there are no definitive "end nodes" in a typical ring topology. As seen in FIG. 3B, each optical node includes optical amplifier 135 and may include means for adding and dropping one or more optical channels from a WDM optical signal. Means for adding and dropping optical channels is depicted in FIG. 3B as three-port optical circulators 150 and 160, optical channel selector 170, optical receiver 175 and optical transmitter 180. In this representation of an optical add-drop, an optical channel selected by channel selector 170 (e.g., an in-fiber Bragg grating) is routed through optical circulator 150 to optical receiver 170. Similarly, an optical channel produced by optical transmitter 170 is reflected by channel selector 170 and added to any pass-through channels along waveguide 120. Note that numerous means for adding and dropping optical channels may be employed in network 100 including, but not limited to, arrayed waveguide gratings, optical couplers, Fabry-Perot filters, multilayer interference filters, etc. The manner in which optical traffic is added to or dropped from optical network 100 is not critical to the instant invention.

In one embodiment, ASE reduction module 200 is positioned prior to node A. Because of the ring network topology, it is understood that ASE reduction module 200 may be positioned at any point along the optical ring including positioning within the optical nodes themselves; the choice of positioning prior to node A is arbitrary in this exemplary embodiment. ASE reduction module 200 includes a laser transmitter 280, which injects a laser at a selected wavelength within ASE region 40 of FIG. 2. For a C-band erbium doped fiber amplifier, this wavelength is selected to be in the region of 1526 to 1534; in an exemplary embodiment the wavelength is selected to be approximately 1531 nm. For an L-band erbium-doped fiber amplifier the wavelength is selected to be in the region of approximately 1560 nm to approximately 1565 nm; in an exemplary embodiment the ASE reduction wavelength is chosen to be approximately 1561 nm. Note that in any given optical ring, both C and L-band optical amplifiers may be present; in such a network topology, ASE reduction wavelengths for both C and L-band amplifiers may be advantageously employed using one or more ASE-reduction modules. Further, it is noted that optical rings having amplifiers other than C and L-band erbium doped fiber amplifiers can benefit from the ASE reduction methods of the present invention; for other amplifiers (e.g., S-band amplifiers and other optical amplifiers) the ASE-reduction wavelength is selected to be within an ASE region of that amplifier's gain curve to achieve the benefits of the present invention.

Although the wavelength may be injected onto optical waveguide 120 using any optical coupler, the exemplary ASE reduction module 200 uses optical circulator 260 along with ASE reduction wavelength selector 270 to add the optical channel to the waveguide. ASE reduction wavelength selector 270 includes an in-fiber Bragg grating configured to reflect the 1531 nm wavelength. The ASE reduction wavelength generated by transmitter 280 enters port 1 of circulator 260 and is reflected by the 1531 nm grating back through port 2 of circulator 260 where it is rotated through to port 2 and output onto waveguide 120. At the "drop" portion of the ASE reduction module, the 1531 nm ASE reduction wavelength enters port 1 of circulator 250 and is selected by ASE reduction wavelength selector 270 (reflected by the 1531 nm grating back through port 2 of circulator 250) and dropped at port 3 to receiver 290.

The gain of optical amplifier 135 of node A using the ASE reduction module 130 is schematically depicted in comparison to gain of optical amplifier A 130 of FIG. 1. Through the injection of an optical wavelength within the ASE region, amplified spontaneous emission is greatly reduced. The injected wavelength stimulates emission at the wavelength of the injected signal using energy that would otherwise be available for spontaneous emission. Due to homogenous line broadening within doped fiber amplifiers, the use of the injected wavelength has the effect of controllably depleting the gain throughout the amplifier's gain bandwidth. In effect, the dropping of the injected wavelength "breaks the ring" of ASE feedback to the initial amplifier in the amplifier chain, eliminating the conditions required for parasitic lasing (i.e., feedback plus gain).

The amount of amplification that the injected wavelength receives as it travels around the optical ring can be used to monitor system performance as well as reduce amplified spontaneous emission and parasitic lasing throughout the network. To this end, ASE controller is optionally provided in reduction module 200. The ASE controller 310 examines the strength of the injected wavelength from receiver 270 and compares it to a table of pre-set values based on the number of operating channels and amplifier power levels which it receives from network intelligence 320 (e.g., a microprocessor which receives network status information from optical service channels, craft interfaces, optical taps, and the like). Based upon the comparison with ideal values, a feedback signal is sent to transmitter 280 that accordingly increases or decreases the power of the injected wavelength.

Figure 5A:
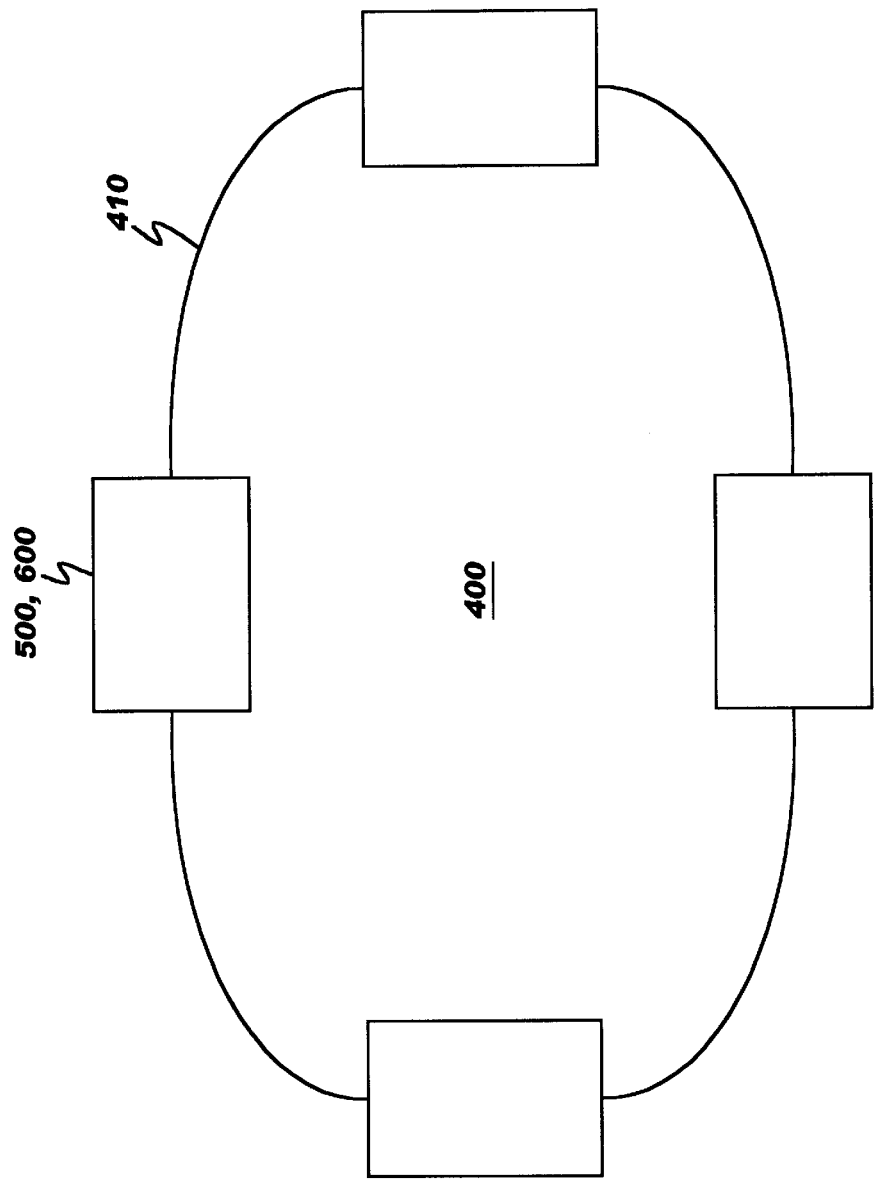
FIGS. 5A, 5B, 5C schematically depict an optical ring having optical nodes incorporating ASE reduction modules.
Figure 5B:
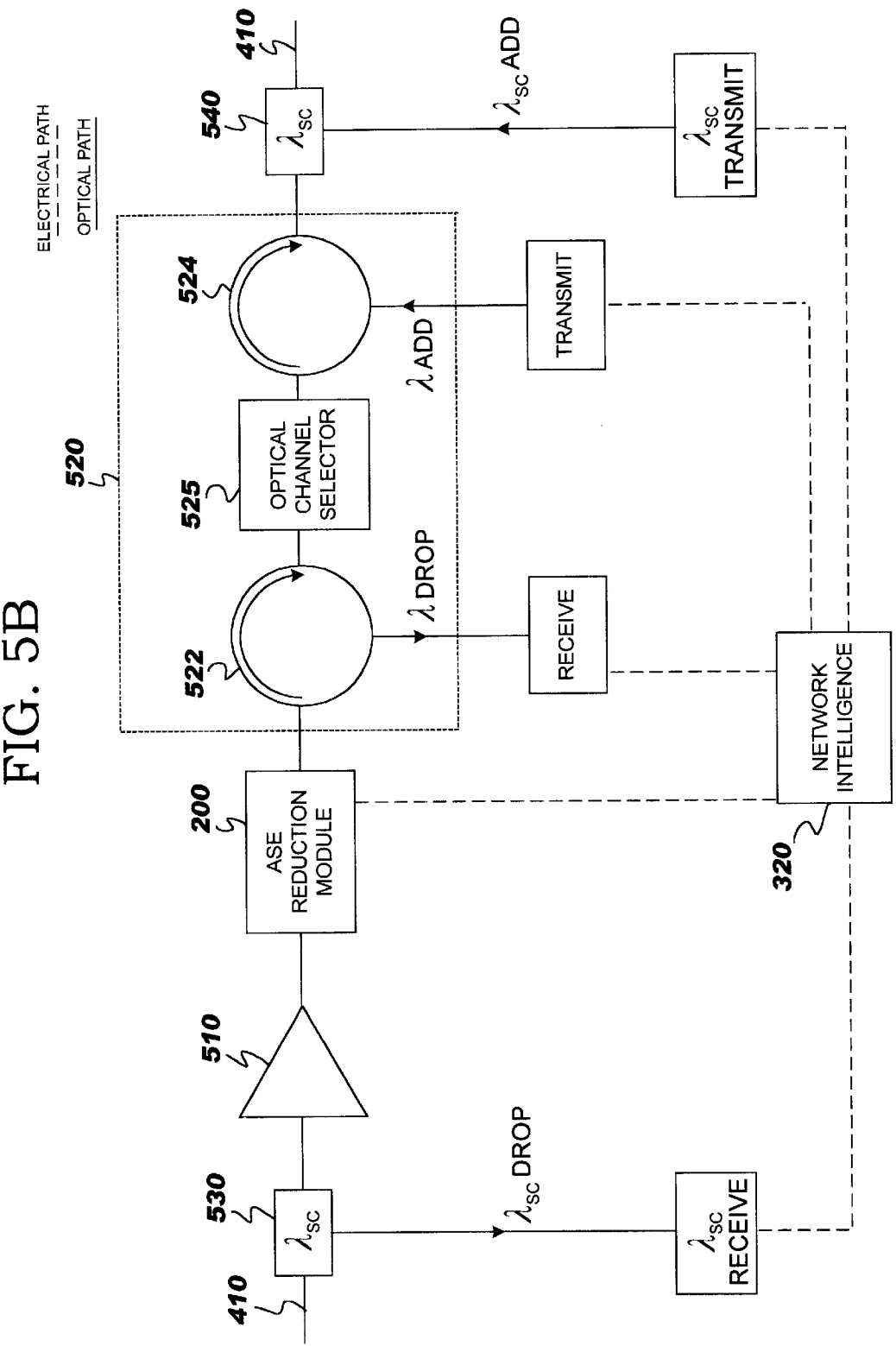
Figure 5C:
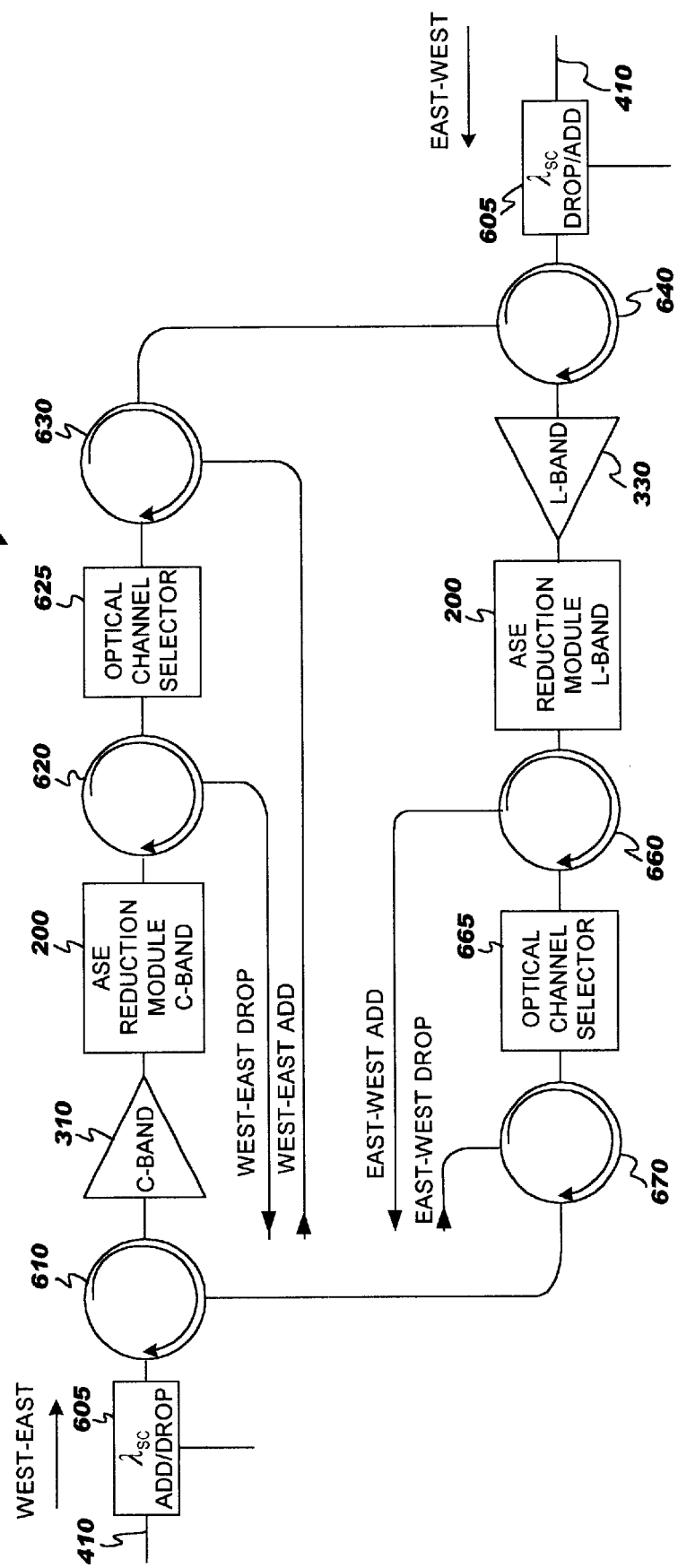

FIGS. 5A, 5B, and 5C show alternate locations for the ASE reduction module within a WDM optical network 400. Optical network 400 includes optical waveguide 410 with optical nodes 500 positioned along the ring. FIG. 5B shows a detailed embodiment of optical node 500 for a unidirectional optical network (i.e., one WDM signal traveling in a single direction around ring 400) while FIG. 5C shows a detailed embodiment of an optical node 600 (used in place of nodes 400 in FIG. 5A) for a bidirectional optical network (i.e., two counter-propagating WDM optical signals traveling in opposite directions around optical ring 400). Typically, for a unidirectional WDM optical network, the optical node spacing is on the order of 70 kilometers; however, it is noted that node spacing is dependent upon the number of amplifiers, number of optical channels, type of waveguide employed, etc. and is therefore not critical to the present invention. In the embodiment of FIG. 5A, ASE reduction module 200 is located within one or more optical nodes 500 or 600, as depicted in FIGS. 5B and 5C. In FIG. 5B, optical node 500 includes an optical amplifier 510 (single or multiple-stage) and an add-drop multiplexer 520 with ASE reduction module 200 positioned between the amplifier output and the add-drop multiplexer input. Add-drop multiplexer 520 includes two three-port optical circulators 522, 524 and an optical channel selector 525, which typically includes one, or more Bragg gratings configured to selectively add-drop a channel pair to optical network 400. Details of add-drop multiplexers are found in *Optical Networks: A Practical Perspective,* incorporated by reference above. In addition to optical amplifier 510, ASE reduction module 200, and add-drop multiplexer 520, optical module 500 may optionally include service channel drop 530 and service channel add 540. The optical service channel may be used to carry network configuration information such as the number of operational nodes, the number of optical channels, amplifier power levels, ASE reduction data etc., and may also be used to dictate the master clocking signal to the optical nodes for SONET clock and data recovery (or to carry timing information from node to node); this information is shared with network intelligence element 320. Using this information, network intelligence element 320 can dynamically control optical power levels of the optical amplifier, optical transmitters, etc. The service channel add and drop modules may comprise optical interference filters to drop and add the optical service channel, Bragg gratings, or other known add-drop means. Although shown as being add-dropped at two locations within optical node 400 the service channel may be added and dropped using a single module as is known in the art.

In an alternative embodiment, optical ring network 400 may be configured to carry two counterpropagating WDM optical signals; in such an embodiment, optical nodes 600 such as those shown in FIG. 5C are employed. Optical nodes 600 include an optically-amplified bidirectional add-drop multiplexer which includes optical circulators 610, 620, 630, 640, 650, 660, and 670 and optical channel selectors 625 and 665. In this configuration, one or more optical channels may be selectively add-dropped from each of the counter-propagating WDM optical signals. Details of the bidirectional add-drop multiplexer are discussed in commonly-assigned U.S. Pat. No. 6,243,177, the disclosure of which is incorporated by reference herein. As in the unidirectional node of FIG. 5B, ASE reduction module 200 is positioned between the output of optical amplifier 310 and the add-drop circulator 620 (upper arm) and the output of optical amplifier 330 and add-drop circulator 660 (lower arm).

In the bidirectional application of the ASE reduction module, each of the counter-propagating WDM optical signals is comprised of optical channels having wavelengths located respectively within the C-band of erbium-doped optical amplifier and the L-band of an erbium-doped optical amplifier. Consequently, a C-band optical amplifier 310 is provided to amplify the west-east optical channels and an L-band amplifier is provided to amplify the east-west optical channels. For this bidirectional configuration using two types of optical amplifiers, two ASE reduction modules are used, as shown in FIG. 5C. The ASE reduction module for the C-band amplifiers launches an optical wavelength at approximately 1531 nm while the ASE reduction module for the L-band amplifiers launches an optical wavelength at approximately 1561 nm, as discussed above.

Due to the bidirectional nature of the network using the nodes of FIG. 5C, the optical service channel may propagate in both directions along the network; similarly, information may be received from the service channel from each of the directions. Details for the bidirectional propagation and reception of service channels is detailed in commonly-assigned allowed U.S. patent application Ser. No. 09/742,220, the disclosure of which is incorporated by reference herein. This technique is used in the optical nodes of FIG. 5C to receive and transmit information bidirectionally.

Although not shown in FIG. 5C for the sake of clarity in FIG. 5C, the network intelligence 320 shown in FIG. 5B would also be used with the optical nodes of FIG. 5C to receive information from the optical service channels, ASE reduction module and the WDM optical channels and use the information to control various network functions.

Note that in the optical network of FIG. 5A, the ASE reduction module is only used in one of the optical nodes; in this manner, the injected wavelength travels through each of the optical amplifiers in the optical network before being dropped. However, for large numbers of optical nodes and networks with large numbers of optical channels, plural ASE reduction modules may be added. Generally, the injected optical wavelength should traverse at least two optical amplifiers before being dropped; more typically, the injected optical wavelength will travel through at least three or four optical amplifiers before being dropped.

Although the injected optical wavelength has been shown as being added to and dropped from optical networks in a variety of configurations, it is noted that the manner in which the injected optical wavelength enters and exits the optical network is not critical; for example, the wavelength may be added in one location (e.g., using an optical coupler) and dropped in another location (e.g., using an optical circulator plus a Bragg grating). Similarly, the configuration of the optical nodes is not critical but is merely exemplary of the type of optical nodes, which may be used, in WDM optical networks having a need for ASE reduction/prevention of parasitic lasing.

Figure 6A:
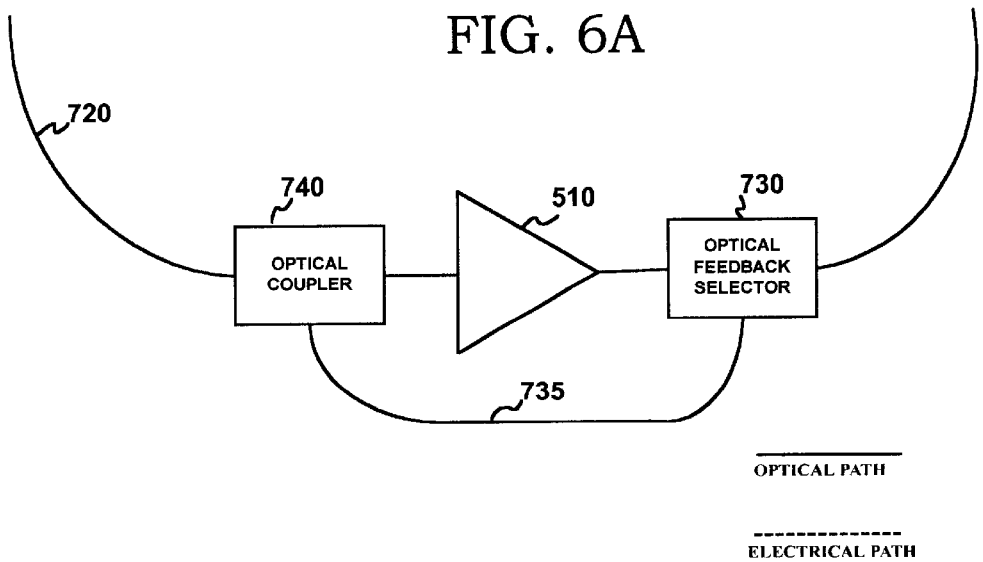
FIGS. 6A and 6B schematically depict a further embodiments of the present invention in which amplified spontaneous emission is fed back to an optical amplifier to create an optical wavelength used for ASE reduction.
Figure 6B:
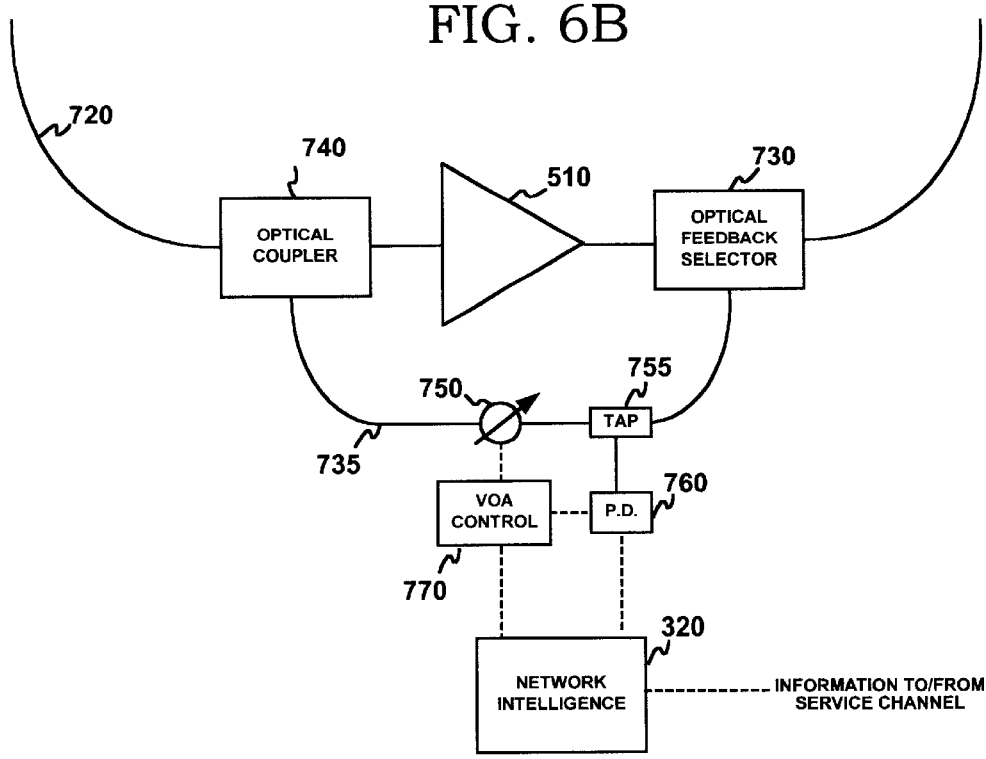

FIGS. 6A and 6B depict alternate embodiments of the present invention in which an ASE reduction is achieved by selectively feeding back a portion of an optical spectrum output by an optical amplifier to the amplifier input. Through appropriate selection of a portion of the optical spectrum from an amplifier output and feedback to an amplifier input, controlled conditions for lasing may be created. In this manner an ASE reduction optical wavelength may itself be created from ASE feedback. As with the injected ASE reduction wavelength, homogenous line broadening results in controlled ASE reduction throughout the gain spectrum of the amplifier.

In FIG. 6A, optical amplifier 510 is interposed along optical ring 720. As in the previous embodiments, other elements may reside on optical ring 720 such as optical nodes including optical add-drop multiplexers as well as additional optical amplifiers. It is understood that optical amplifier 510 may be a single or multiple stage amplifier and can have numerous configurations as are known in the art. Positioned in optical communication with the output of optical amplifier 510 is optical feedback selector 730. The expression "in optical communication with," as used herein, relates to any two optical elements through which an optical signal propagates and may be a direct path or may route through intermediate optical devices (e.g., optical isolators, optical circulators, filters, amplifiers, etc.) whether positioned immediately adjacent to one another or communicating through lengths of optical fiber.

The desired output portion of the optical spectrum is selected by optical feedback selector 730 and placed on optical feedback path 735. That portion of the spectrum rejoins optical ring 720 via wavelength selective optical coupler 740 and is re-fed as input to optical amplifier 510. Through this technique a wavelength is spontaneously generated by oscillation within the feedback. The wavelength with the highest net gain will preferentially oscillate, typically within the range of 1530–1532 nm for C-band EDFAs and within the range of 1560–1562 for L-band EDFAs. In this manner, lasing is deliberately precipitated in a controlled manner in order to reduce the overall ASE on the optical ring through the mechanism of homogenous line broadening in the gain medium of the formed optical wavelength. Through use of the selective feedback technique, the injection of a separate ASE reduction wavelength can be avoided since the wavelength created through ASE feedback will perform the ASE reduction function for the optical network. Consequently, closed-ring amplified WDM metropolitan networks can be formed without the need to "break the ring" in order to avoid uncontrolled build-up of ASE.

Optical feedback selector 730 may be any device that selects a portion of the optical output spectrum to be placed on feedback path 735. Exemplary selectors include thin film multilayer interference filters, narrow-band or wide-band Bragg gratings (which may be used in combination with one or more optical circulators to reflect the desired portion of the optical spectrum onto feedback path 735), edge filters (removing the optical spectrum from 1532 nm or 1531 nm and lower), notch filters (e.g., removing the portion of the spectrum from 1530 to 1532 nm for C-band or 1560–1562 for L-band EDFAs), a tunable Fabry-Perot etalon or any other optical device or combination of devices which can select a portion of an optical spectrum and place that spectrum onto the optical feedback path.

Wavelength selective optical coupler 740 may be selected from a variety of optical devices such as fused fiber couplers, multilayer interference filters, optical circulators coupled to Bragg gratings to reflect the added wavelength, etc. When using fused fiber couplers, the percentage of traffic taken from ring 720 and path 735 may be selected from a range of values from 50:50 to 80:20, 90:10, or 95:5, for example. The particular amount from the optical path is selected to be sufficiently large enough to effect an overall ASE reduction based on operating parameters such as the total number of optical channels, size of the optical ring, amplifier gain, etc.

In the embodiment shown in FIG. 6B, a variable optical attenuator 750 is interposed along optical feedback path 735. Optical attenuator 750 is used to selectively reduce the amount of ASE fed back into amplifier 510 to create the desired strength of a generated optical wavelength. As in the embodiment of FIG. 6A, the created wavelength is spontaneously generated by oscillation within the amplifier feedback path. The optical feedback selector 730 and optical coupler 740 are selected from the devices discussed in connection with the embodiment of FIG. 6A.

In order to determine the set point of variable optical attenuator 750, an optical tap 755 (e.g., 1%, 2%, or 5%) is optionally placed in optical feedback path 735. The signal strength from the optical tap is measured using photodetector 760. The signal strength is sent to variable optical attenuator controller 770, which controls the voltage applied to attenuator 750 based on predetermined values of required attenuation to produce the necessary signal strength of the optical wavelength fed back to the input of amplifier 510. The VOA controller 770 and photodetector 760 optionally electrically communicate with network intelligence 320 which in turn can communicate with other optical nodes through the optical service channels, as discussed in connection with the earlier embodiments. Alternatively, depending upon the number of optical channels carried by the ring, variable optical attenuator 750 may be replaced by a fixed optical attenuator. In an exemplary embodiment, typical values of the attenuator for use with high gain EDFAs are approximately 20–25 dB. These values vary with the gain characteristics of the amplifier and loss characteristics of the optical feedback selector.

Although not shown in FIGS. 6A and 6B, the optical amplifier configurations depicted in those embodiments may be used in any of the network configurations of FIGS. 5A–5C (i.e., they may be used in unidirectional WDM optical networks, bidirectional WDM optical networks and may be placed within an optical add-drop node or at other locations along an optical ring. When used in the add-drop nodes of FIG. 5, the ASE reduction modules would be replaced with the ASE feedback paths, optical feedback selectors, and wavelength selective optical couplers positioned around each amplifier as shown in FIGS. 6A and 6B).

Figure 7:
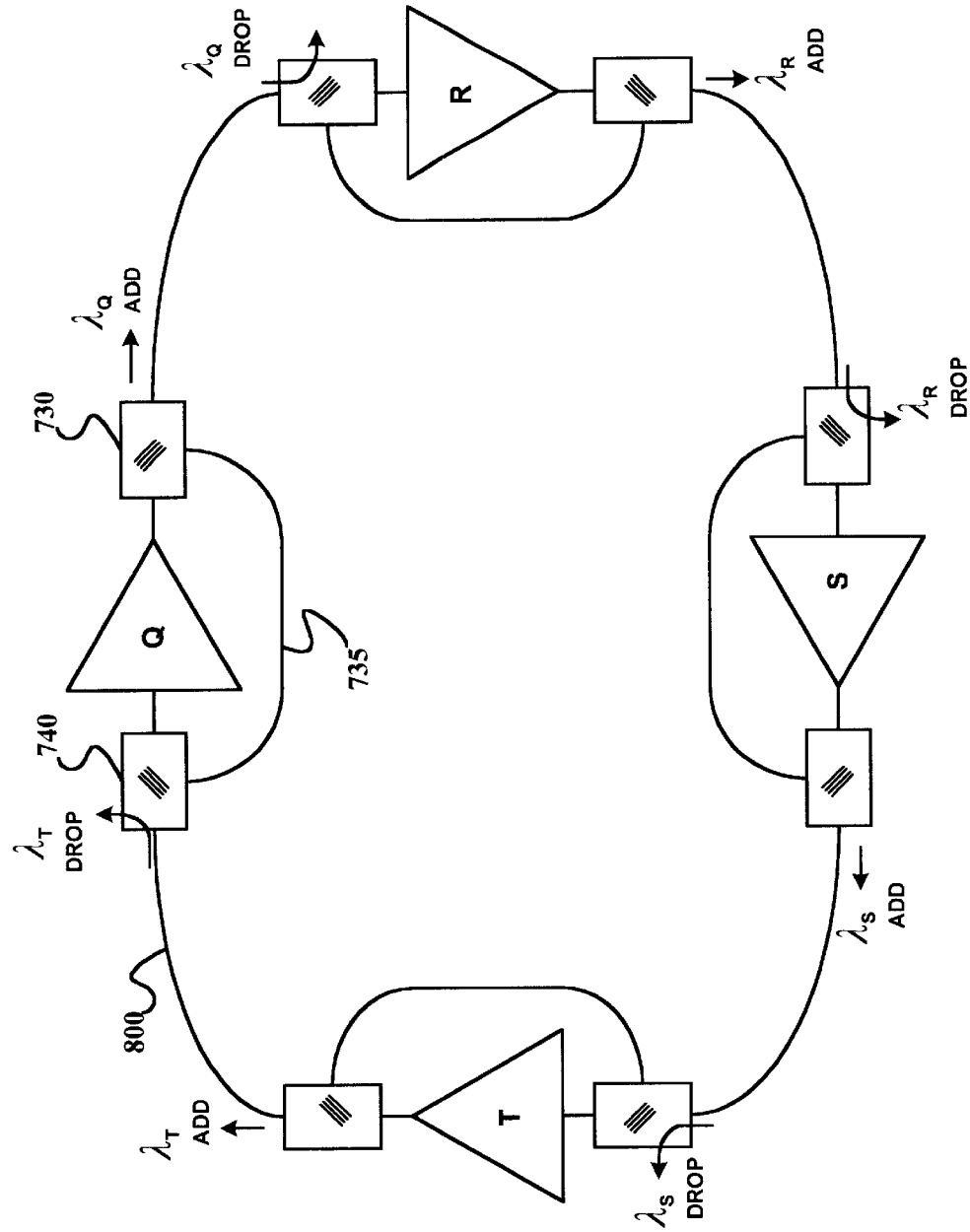
FIG. 7 schematically depicts an amplified optical ring network using the ASE feedback techniques of FIG. 6; the add and drop locations of the created wavelengths are depicted at each amplifier location.

FIG. 7 schematically depicts an amplified optical ring 800 having four optical amplifiers Q, R, S, and T (although not shown for clarity of presentation, it is understood that these optical amplifiers may be positioned within unidirectional or bidirectional add-drop nodes, as discussed above, or at other locations (e.g., line amplifiers) within the optical ring 800). Each optical amplifier includes an optical feedback system as shown in either FIG. 6A or FIG. 6B (details of the VOA system are not shown in FIG. 7). As seen in FIG. 7, each wavelength created by ASE feedback at amplifiers Q, R, S, and T, that is, $\lambda_Q$ $\lambda_R$ $\lambda_S$ $\lambda_T$, is dropped by the wavelength selective optical coupler at the next successive optical amplifier ($\lambda_Q$ is dropped at the input of amplifier R, $\lambda_R$ is dropped at the input of amplifier S, $\lambda_S$ is dropped at the input of amplifier T, and $\lambda_T$ is dropped at the input of amplifier Q). In the exemplary embodiment of FIG. 7, each of devices 730 and 740 are selected to be multilayer interference filters configured to remove wavelengths lower than 1532 nm (for C-band amplifiers) or 1562 nm (for L-band amplifiers); devices 730 and 740 have opposite orientations (as schematically depicted) such that the created wavelength is added at each of devices 730 and is dropped at each of devices 740. In this manner, an ASE-reduction wavelength is present on each section of optical ring 800 and is dropped at the input of each amplifier to prevent uncontrolled buildup of ASE on the ring.

While the above invention has been described with reference to the particular exemplary embodiments, many modifications and functionally equivalent elements may be substituted without departing from the spirit and contributions of the present invention, namely, the provision of an ASE reduction system within a wavelength division multiplexed optical network. Accordingly, modifications and functionally equivalent elements such as those suggested above, but not limited thereto, are considered to be within the scope of the following claims.

What is claimed is:

1. A wavelength division multiplexed optical communication system comprising:

an optical fiber ring configured to carry at least one wavelength division multiplexed optical communication signal, the wavelength division multiplexed optical communication signal comprising plural optical channels at different wavelengths;

a plurality of optical amplifiers interposed along the optical fiber ring for optically amplifying the wavelength division multiplexed optical communication signal, each of the plurality of optical amplifiers comprising;

an optical feedback selector for selecting a portion of an amplified spontaneous emission spectrum characteristic of the optical amplifier in the optical fiber ring positioned in optical communication with an output of the optical amplifier on the optical fiber ring;

an optical feedback path optically communicating with the optical feedback selector for transporting the selected portion of the amplified spontaneous emission spectrum;

a wavelength selective optical coupler optically communicating with the optical feedback path and optically communicating with the input of the optical amplifier for feeding back the selected portion of the amplified spontaneous emission spectrum to an input of the optical amplifier such that a lasing wavelength is spontaneously generated by oscillation within the feedback, the lasing wavelength being output to the optical ring such that it travels along the optical fiber ring to a next adjacent optical amplifier positioned downstream on the optical fiber ring where the lasing signal is dropped by a wavelength selective optical coupler optically communicating with an optical input port of the next adjacent optical amplifier;

each optical amplifier in the optical ring producing a lasing wavelength through selective feedback of ASE to the amplifier input, the lasing wavelength traveling to each subsequent amplifier where the lasing wavelength is dropped by the wavelength selective optical coupler of each subsequent optical amplifier such that a reduction of amplified spontaneous emission occurs in the optical fiber ring.

2. A wavelength division multiplexed optical communication system according to claim 1 wherein the optical feedback selector comprises a Bragg grating.

3. A wavelength division multiplexed optical communication system according to claim 1 wherein the optical feedback selector comprises a Fabry-Perot etalon.

4. A wavelength division multiplexed optical communication system according to claim 1 wherein the optical feedback selector comprises a multilayer interference filter.

5. A wavelength division multiplexed optical communication system according to claim 1 wherein the optical feedback selector comprises an edge filter.

6. A wavelength division multiplexed optical communication system according to claim 1 wherein the optical feedback selector comprises a notch filter.

7. A wavelength division multiplexed optical communication system according to claim 1 wherein the optical amplifier is a C-band erbium doped fiber amplifier.

8. A wavelength division multiplexed optical communication system according to claim 1 wherein the optical amplifier is an L-band erbium doped fiber amplifier.

9. A wavelength division multiplexed optical communication system according to claim 1 wherein the wavelength selective optical coupler comprises a fused-fiber coupler.

10. A wavelength division multiplexed optical communication system according to claim 1 wherein the wavelength selective optical coupler comprises a Bragg grating.

11. A wavelength division multiplexed optical communication system according to claim 1 wherein the wavelength selective optical coupler comprises a multilayer interference filter.

12. A wavelength division multiplexed optical communication system according to claim 1 further comprising a variable optical attenuator positioned along the optical feedback path.

13. A wavelength division multiplexed optical communication system according to claim 12 further comprising an optical tap positioned along the optical feedback path.

14. A wavelength division multiplexed optical communication system according to claim 13 further comprising an optical detector for receiving an optical signal from the optical tap.

15. A wavelength division multiplexed optical communication system according to claim 14 further comprising a controller for the variable optical communicator that receives information concerning the strength of the optical signal from the optical detector and determines the setting of the variable optical attenuator based on the detected signal strength.

16. A wavelength division multiplexed optical communication system according to claim 1 further comprising a fixed optical attenuator positioned along the optical feedback path.

* * * * *